US010459120B2

(12) United States Patent
Averbuch et al.

(10) Patent No.: US 10,459,120 B2
(45) Date of Patent: Oct. 29, 2019

(54) METHOD AND APPARATUS FOR PROVIDING A WEATHER VOLATILITY INDEX

(71) Applicant: HERE GLOBAL B.V., Eindhoven (NL)

(72) Inventors: Alex Averbuch, Buffalo Grove, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 186 days.

(21) Appl. No.: 15/618,927

(22) Filed: Jun. 9, 2017

(65) Prior Publication Data
US 2018/0356560 A1 Dec. 13, 2018

(51) Int. Cl.
*G01W 1/10* (2006.01)
*G01W 1/00* (2006.01)

(52) U.S. Cl.
CPC ........ *G01W 1/10* (2013.01); *G01W 2001/006* (2013.01); *G01W 2203/00* (2013.01)

(58) Field of Classification Search
CPC ............. G01W 1/10; G01W 2001/006; G01W 2203/00
See application file for complete search history.

(56) References Cited

U.S. PATENT DOCUMENTS

| 7,082,382 B1 | 7/2006 | Rose, Jr. et al. |
| 7,249,007 B1 | 7/2007 | Dutton |
| 2004/0158832 A1* | 8/2004 | Chechik .............. G01C 11/025 718/102 |
| 2009/0210353 A1* | 8/2009 | Mitchell ................. G01W 1/10 705/36 R |
| 2012/0330549 A1 | 12/2012 | Dannevik et al. |
| 2013/0024118 A1 | 1/2013 | Gershunov et al. |

FOREIGN PATENT DOCUMENTS

WO 2011/018578 A1 2/2011

OTHER PUBLICATIONS

Silver et al., "Which City Has the Most Unpredictable Weather?", FiveThirtyEight, Dec. 4, 2014, web page, http://fivethirtyeight.com/features/which-city-has-the-most-unpredictable-weather/, 13 Pages.

(Continued)

*Primary Examiner* — Bryan Bui
(74) *Attorney, Agent, or Firm* — Ditthavong & Steiner, P.C.

(57) ABSTRACT

An approach is provided for generating a volatility index for weather data. The approach involves retrieving weather data collected from one or more weather sensors over a temporal domain, a spatial domain, or a combination thereof. The one or more weather sensors provide the weather data for at least one geographic point. The approach also involves processing the weather data to determine volatility data for at least one weather attribute, wherein the volatility data represents how much the at least one weather attribute changes over the temporal domain, the spatial domain, or a combination thereof. The approach further involves generating a volatility index to represent the volatility data.

20 Claims, 15 Drawing Sheets

(56) References Cited

OTHER PUBLICATIONS

Rangarajan et al., "A Climate Predictability Index and Its Applications", Geophysical Research Letters, vol. 24, No. 10, May 15, 1997, pp. 1239-1242.
San Francisco State University, "Measures of Temporal Precipitation Variability", web page, retrieved on Apr. 14, 2017 from http://tornado.sfsu.edu/geosciences/classes/m356/RainfallVariability/TempVar.htm, 4 Pages.
Ganguly et al., "Knowledge Discovery from Sensor Data for Scientific Applications", Learning from Data Streams, Processing Techniques in Sensor Networks, Chapter 13, 2008, pp. 205-229.
Beek, "Spatial Interpolation of daily meteorological data", Report 53.1, Dec. 31, 1991, 38 pages.
Sluiter, "Interpolation methods for climate data", Literature Review, 2009, 28 pages.
Office Action for corresponding European Patent Application No. 18176576.9-1001, dated Nov. 6, 2018, 10 pages.

\* cited by examiner

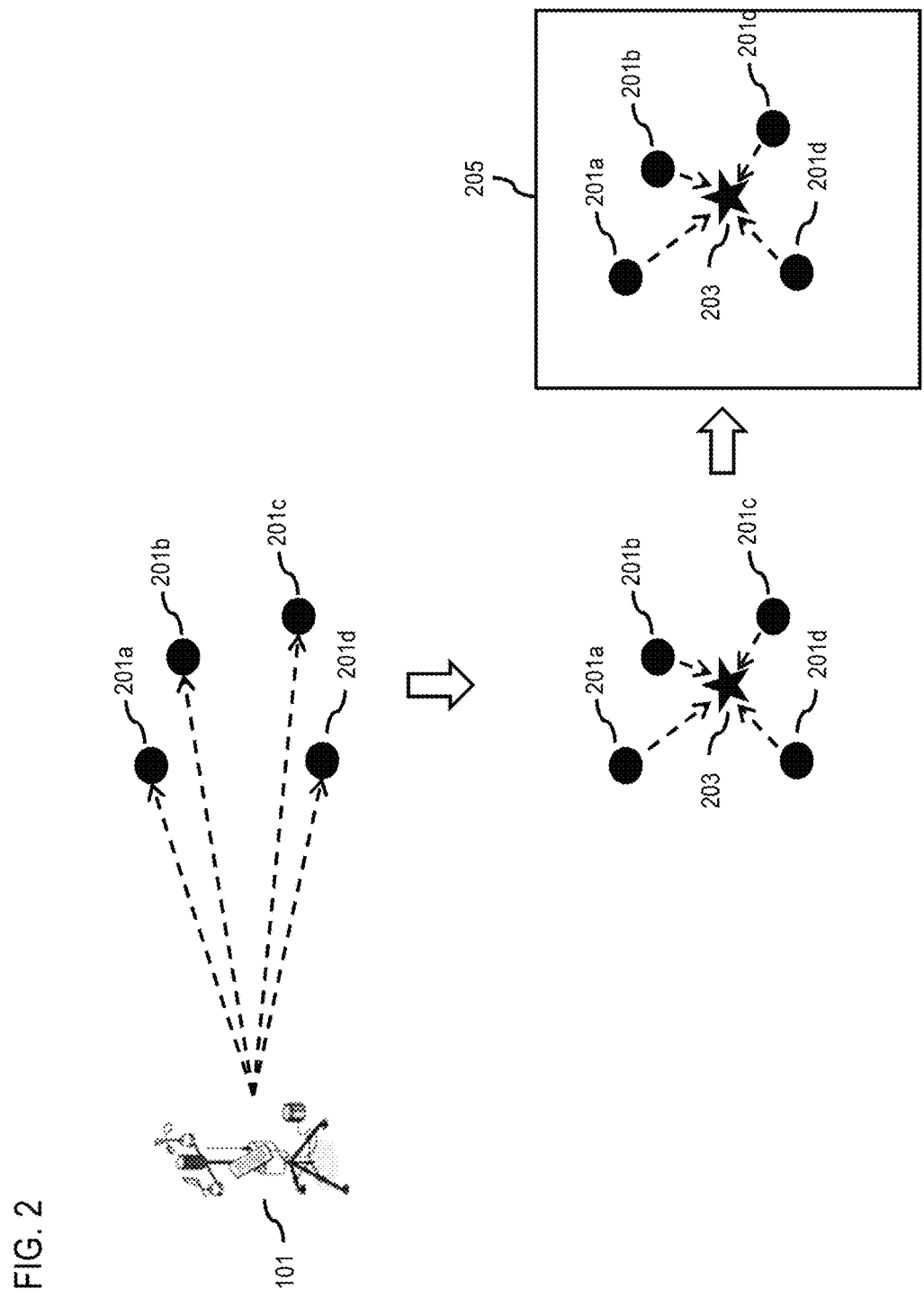

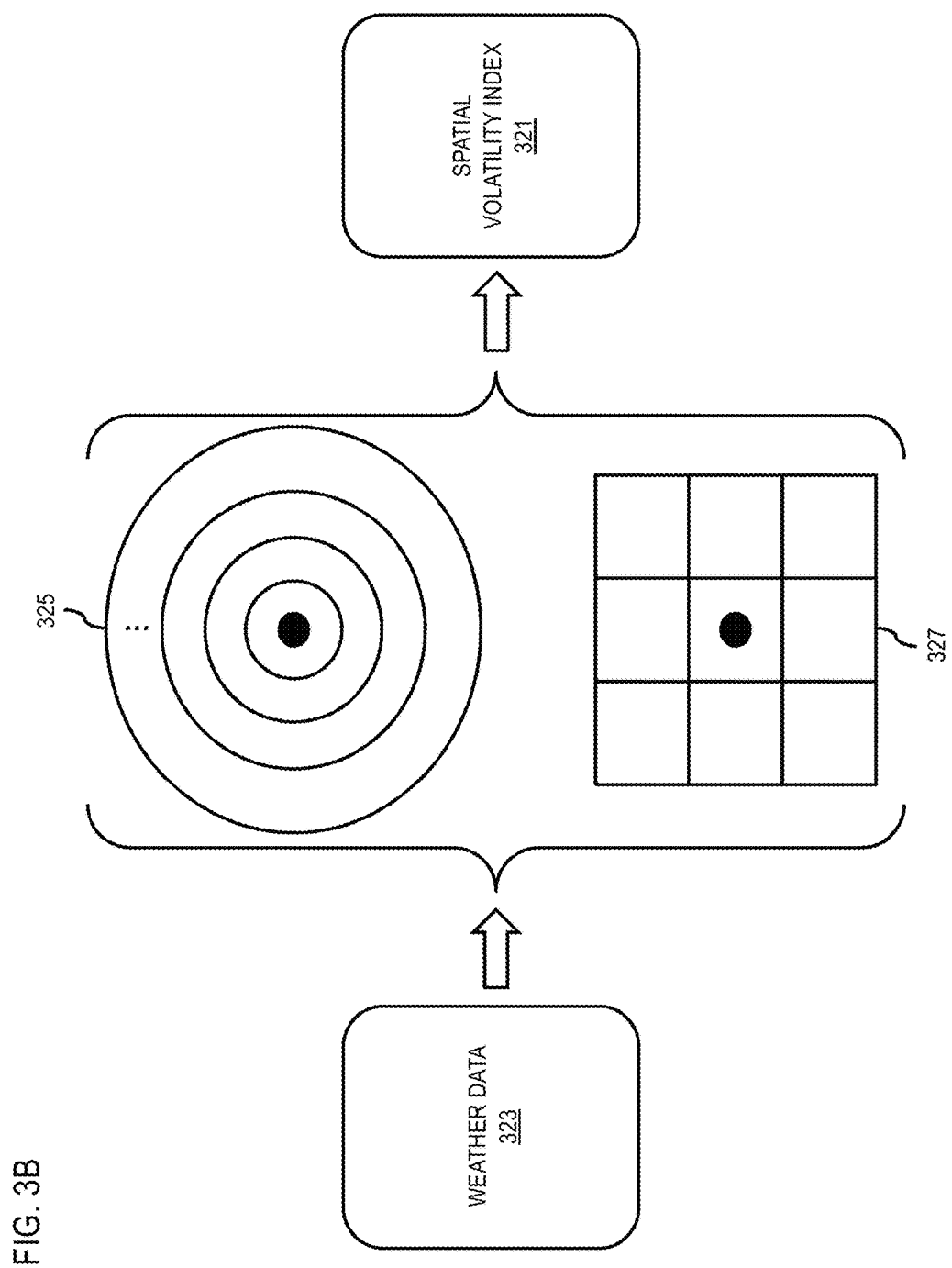

METHOD AND APPARATUS FOR PROVIDING A WEATHER VOLATILITY INDEX

BACKGROUND

Because of the popularity of real-time weather services, weather service providers have devoted significant efforts to ensuring that they provide accurate, precise, and timely weather data. One primary obstacle to this effort is the natural variability of weather data. For example, this variability generally is not uniform across all locations and can vary across different terrains, locations, etc., thereby creating significant technical challenges for the service providers to overcome to deliver consistent weather services across these different locations.

SOME EXAMPLE EMBODIMENTS

Therefore, there is a need for providing a weather volatility index for characterizing how volatile or variable a weather attribute (e.g., temperature, pressure, precipitation, etc.) is at a location or area. This volatility index can then be used to determine how a service provider uses or provides weather data to end users.

According to one embodiment, a computer-implemented method comprises retrieving weather data collected from one or more weather sensors over a temporal domain, a spatial domain, or a combination thereof. The one or more weather sensors provide the weather data for at least one geographic point. The method also comprises processing the weather data to determine volatility data for at least one weather attribute. The volatility data represents how much the at least one weather attribute changes over the temporal domain, the spatial domain, or a combination thereof. The method further comprises generating a volatility index to represent the volatility data.

According to another embodiment, an apparatus comprises at least one processor, and at least one memory including computer program code for one or more computer programs, the at least one memory and the computer program code configured to, with the at least one processor, cause, at least in part, the apparatus to retrieve weather data collected from one or more weather sensors over a temporal domain, a spatial domain, or a combination thereof. The one or more weather sensors provide the weather data for at least one geographic point. The method is further caused to process the weather data to determine volatility data for at least one weather attribute. The volatility data represents how much the at least one weather attribute changes over the temporal domain, the spatial domain, or a combination thereof. The apparatus is also caused to generate a volatility index to represent the volatility data.

According to another embodiment, a computer-readable storage medium carries one or more sequences of one or more instructions which, when executed by one or more processors, cause, at least in part, an apparatus to retrieve weather data collected from one or more weather sensors over a temporal domain, a spatial domain, or a combination thereof. The one or more weather sensors provide the weather data for at least one geographic point. The method is further caused to process the weather data to determine volatility data for at least one weather attribute. The volatility data represents how much the at least one weather attribute changes over the temporal domain, the spatial domain, or a combination thereof. The apparatus is also caused to generate a volatility index to represent the volatility data.

According to another embodiment, an apparatus comprises means for retrieving weather data collected from one or more weather sensors over a temporal domain, a spatial domain, or a combination thereof. The one or more weather sensors provide the weather data for at least one geographic point. The apparatus also comprises means for processing the weather data to determine volatility data for at least one weather attribute. The volatility data represents how much the at least one weather attribute changes over the temporal domain, the spatial domain, or a combination thereof. The apparatus also comprises means for generating a volatility index to represent the volatility data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram illustrating an example of weather data locations used for providing a weather volatility index, according to one embodiment;

FIG. 3B is a diagram illustrating a process for generating a spatial volatility index for a weather attribute, according to one embodiment;

DESCRIPTION OF SOME EMBODIMENTS

Examples of a method, apparatus, and computer program for detecting a quality weather provider, weather station, or weather report are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
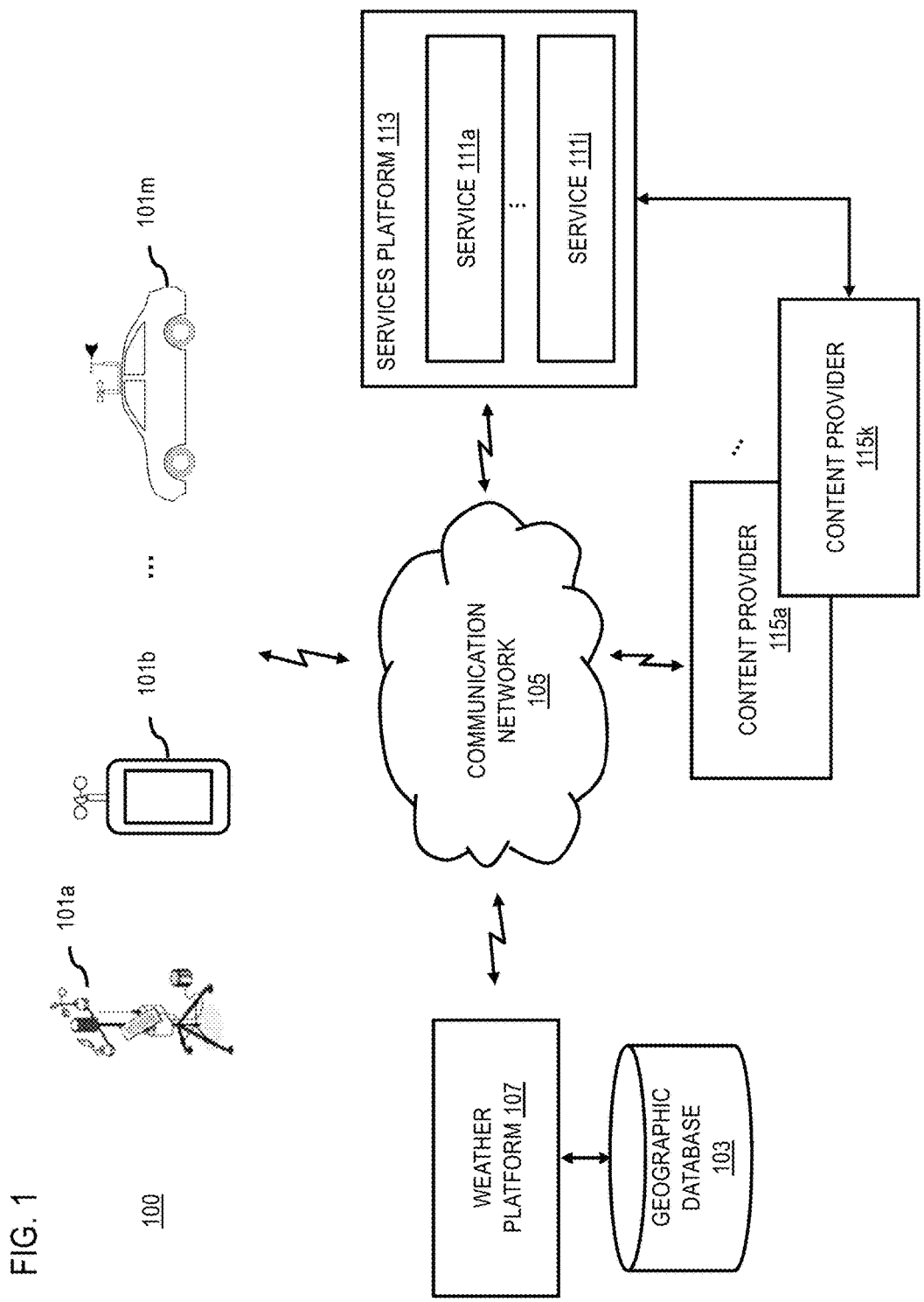
FIG. 1 is a diagram of a system capable of providing a weather volatility index, according to one embodiment.

FIG. 1 is a diagram of a system capable of providing a weather volatility index, according to one embodiment. Weather varies according to many factors such as terrain (e.g. mountainous regions) and the presence of water bodies such as lakes, oceans, and seas. As a result, different locations with different terrain or features (e.g., water features), can have different levels of weather variability. In some cases, by not taking into account weather variability across different locations, weather service providers may either be expending too many resources (e.g., by over sampling a weather attribute in areas with less weather variability or volatility) or too few resources (e.g., by under sampling a weather attribute in areas with more weather volatility). This can also lead to the weather service provider providing less consistent, accurate, or precise weather data to its users.

To address this problem, a system 100 of FIG. 1 introduces a capability to generate a volatility index based the detected variability or volatility of weather data collected from weather stations 101a-101m (also collectively referred to as weather stations 101) providing weather data for a geographic point or area. In one embodiment, the weather stations 101 are equipped with sensors for measuring one or more weather attributes (e.g., temperature, pressure, precipitation, etc.). As a result, the volatility index can be determined with respect to one or more of the individual weather attributes.

In one embodiment, the weather volatility index can be determined over a temporal domain, spatial domain, or a combination thereof. For example, a temporal weather volatility index represents how variable a weather attribute is at a given location or area over a period of time. Similarly, a spatial weather volatility index represents how variable a weather attribute at different distances in a specified area or an area around a target geographic point.

In one embodiment, this weather volatility index provides a useful mechanism that the system 100 can use to adapt one or more weather services. For example, for weather services that use interpolation of weather data to predict or estimate weather at one location from data collected from other location, the volatility index can be used to adjust the spatial and temporal interpolation ranges (e.g., ranges that specify over how far in time or distance interpolation of weather data can occur). For example, in areas where the volatility index is low, the system 100 can relax the interpolation ranges, but in areas where the volatility index is high, the system 100 can apply more conservative or limited interpolation ranges.

An example use-cases of the volatility index include, but are not limited to: (1) using the volatility index a prioritization of the areas for which the system 100 should compute and/or publish weather reports (e.g., compute or publish for areas with the highest volatility index first); and (2) allocating or recommending the allocation of weather stations 101, weather sensors, etc. (e.g., allocate more weather stations 101 to areas with higher volatility). More specifically, weather reports or weather data generally comes from two sources, which are stationary weather stations 101 (e.g., weather station 101a such as those at airports) and mobile weather stations (e.g., connected cars or devices such as weathers stations 101b and 101m). For example, each weather report can be interpolated to other locations because for each location point at which weather data is requested, there may not be a corresponding weather station 101. Thus, the system 100 can interpolate weather data using limits on the distance and limits on the time to increase coverage. For example, for the case of temperature observations, the system 100 can interpolate an observation to approximately 50 km from the reporting weather station 101.

Traditionally, these limits on interpolation have been fixed to a single value. However, by computing the volatility index according to the various embodiments described herein, the system 100 can apply dynamic interpolation limits that depend on volatility index for the location. For example, in mountainous regions where the volatility index is likely to be high, the system 100 can apply lower time and/or space thresholds for interpolating data (e.g., lower than the typical fixed 50 km space constraint). Therefore, if the system 100 receives a weather observation of temperature in the mountains (e.g., from a vehicle-based or mobile weather station 101), the system 100 can apply a lower interpolation distance limit (e.g., lower than 50 km), and thus will not be able to interpolate that report to a location 50 km away or to any other location more than the dynamic distance threshold. On the other hand, in the plains that are far from water bodies where the volatility index should be low, the system 100 can apply a more relaxed interpolation thresholds on space and time cut-offs (e.g., greater than 50 km). Accordingly, interpolation the weather report to a location 50 km away may be reasonable.

In one embodiment, the system 100 can generate weather volatility indices for geographic points and/or geographic areas. For example, as shown in FIG. 2 which illustrates an example of weather data locations used for providing a weather volatility index according to one embodiment, the system 100 can determine the locations 201a-201d (also collectively referred to as locations 201) of respective weather stations 101, and then generate volatility indices individually for one or more of the locations 201.

In one embodiment, the system 100 can use one or more of the weather stations 101 corresponding the locations 201 to determine weather data for an interpolated location 203. The system 100 can then generate the volatility index for the interpolated location 203. In yet another embodiment, any of the locations 201 and/or the interpolated location 203 can represent a geographic area 205. The volatility index would then be correspond to the variability or volatility of a weather attribute within the geographic area 205. The geographic area 205, for instance, can correspond to a map tile of a tile-based map representation of a geographic database 103. In addition or alternatively, the geographic area 205 can correspond to a node, a road link, an intersection, a point of interest (POI), and/or any other feature stored or represented in the geographic database 103.

In one embodiment and as previously noted, the system 100 provides for at least two measures of volatility: (1) a temporal volatility index, and (2) a spatial volatility index. With respect to a temporal volatility index and given a geographic point or area, this index reflects how volatile weather is across time. That is, as time elapses how much the weather changes for the given attribute at the target location or area. For a spatial volatility index, given a geographic point or area, this index reflects how volatile weather is across distance. That is, as the distance in an area (e.g., a map tile) increases, how much the weather changes for the given attribute at the target location or area.

In one embodiment, the volatility index (e.g., temporal and/or spatial) is computed for each weather attribute using historical weather data. Thus, for a given geographic point or area (e.g., map tile), there can be temperature volatility index, pressure volatility index, precipitation volatility index, etc. over a time and/or spatial domain.

Figure 3A:
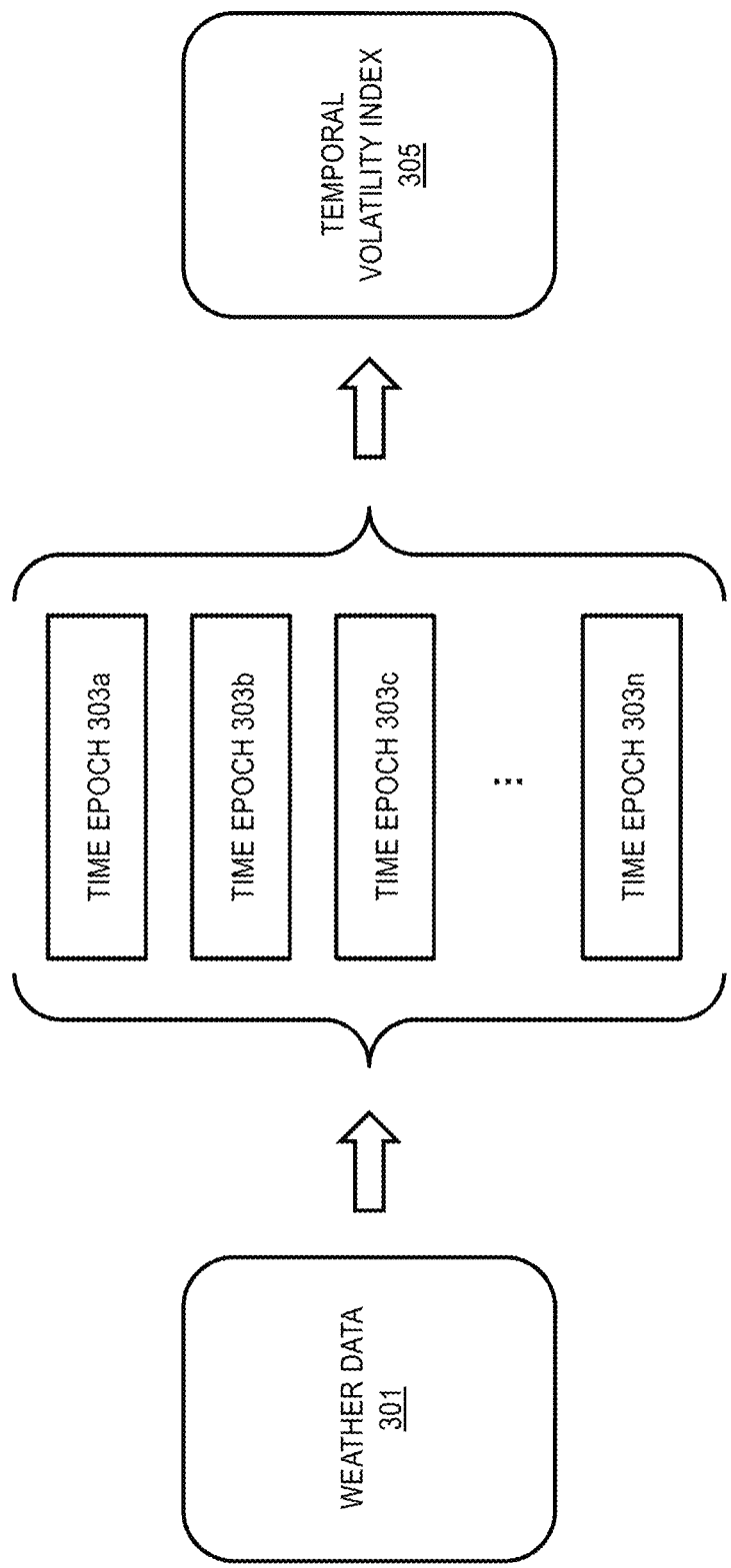
FIG. 3A is a diagram illustrating a generating a temporal volatility index for a weather attribute, according to one embodiment.

Assuming that we are computing the time and spaced based volatility index for Tile A in FIG. 1. Let's assume that we want to compute the time based volatility index specifically for the temperature weather attribute. The procedure is as follows:

FIG. 3A is a diagram illustrating a process for generating a temporal volatility index for a weather attribute, according to one embodiment. As shown, for each target point or area (e.g., a map tile), the system 100 gathers historical weather data 301 (e.g., historical temperature data in this example). In one embodiment, the historical weather data 301 includes data that corresponds or is interpolated to the target geographic area. In an embodiment in which a geographic area such as a map tile is targeted, the weather data can correspond to a centroid of the area or any other specified location(s) within the target area. Because this example is illustrated with respect to temperature, the system 100 uses the weather data 301 to compute a temperature volatility index. It is noted that the procedure for a general weather attribute or any other weather attribute is analogous to the process described in this embodiment.

In one embodiment, the historical weather data 301 can be collected from any specified period of time. For example, if seasonal variations are to be captured, then historical weather data 301 should at least cover one year. However, if seasonal variations are to be determined, the historical weather data 301 can be segmented according to seasons so that separate volatility indices can be computed for each season. It is noted that the volatility index can be captured with respect to any contextual parameter as along as the weather data 301 is segmented according to that contextual parameter. For example, if day versus night volatility is to be differentiated, then the weather data 301 can be segmented into day versus night to enable calculating separate volatility indices. Other examples of contextual parameters include, but are not limited to, different weather events, different types of weather stations 101, different types of weather sensors used to measure the same attribute, etc.

After retrieving the weather data 301, the system 100 organizes the historical data 301 for the given point or area by time. For example, the weather data can be organized into different time epochs 303a-303n (also collectively referred to as time epochs 303). The time epochs 303 can span any period of time (e.g., 15 mins, 1 hour, etc.) depending on the level of granularity desired for determining the variability or volatility of the weather data 301.

In one embodiment, the system 100 can then discard any outliers by throwing out unreasonable weather attribute values (e.g., temperature values). The reasonable range can be determined based on ranges that expected to normally occur in nature. For example, temperature values outside a reasonable range (e.g., −30° C. and 100° C.) can be immediately suppressed as erroneous data.

From the remaining data after outlier suppression, the system 100 computes a measure of weather volatility (e.g., a temporal volatility index 305) for the weather attribute (e.g., for temperature). In this contemplated that any means for determining variability in a data can be used to determine volatility data from the weather data set 301 (e.g., standard deviation, coefficient of variation, etc.). In one embodiment, the system 100 considers the average difference across the different time epochs 303 as a measure of volatility. By way of example, the average difference is computed as follows: given time ordered historical temperature data for tile A as t1, t2, t3, t4, t5 . . . to (e.g., corresponding to time epochs 303), $$\text{temperature volatility index} = \sum_{i=0}^{i=n-1} (|t_i - t_{i+1}|)/n$$

In one embodiment, the equation above can generalized to any other weather attribute to compute the temporal volatility index 305.

After the computation of temporal volatility index 305, the system 100 can optionally perform a normalization process. This normalization process, for instance, ensures that the volatility index values are adjusted to a common scale so that comparisons of different volatility indices can be performed more easily. In on embodiment, the normalized can include dividing the temporal volatility index 305 by a mean value, maximum value, minimum value, or the like for the corresponding weather attribute computed from the weather data 301. It is contemplated that any means for normalizing the resulting volatility index 305 can be used according to the various embodiments described herein.

In one embodiment, the embodiments of the process described above that was used for temperature can also be used to compute the volatility index for the different weather attributes such as visibility, humidity, and pressure. For visibility volatility index, assume that for a given geographic point or area (e.g., a map tile), the system 100 can generate time ordered visibility reports as V1, V2, V3, V4, V5 . . . Vn (e.g., corresponding to the time epochs 303), then $$\text{visibility volatility index} = \sum_{i=0}^{i=n-1} (|V_i - t_{i+1}|)/n$$

In addition or as an alternate to computing the temporal volatility index 305, the system 100 can compute a distance based or spatial volatility index 321 for each weather attribute as shown in FIG. 3B. In one embodiment, the spatial volatility index 321 measures the volatility across the spatial or distance domain for each weather attribute. As with the temporal volatility index 305, the spatial volatility index 321 can be any measure of variability or volatility such as an average difference.

In one embodiment, the procedure for generating the spatial volatility index 321 begins as described with respect to the temporal volatility index 305. That is, the system 100 retrieves a historical weather data 323 that is equivalent to the weather data 301 of FIG. 3A. In this case, however, the historical weather data 323 is collected from or interpolated to locations at various distances from the target geographic point or one or more reference points (e.g., a centroid) of a target geographic area (e.g., a map tile). In one embodiment, the weather data 323 consists of weather reports recorded at approximately the same time or over the same time period.

In one embodiment, the system 100 then organizes the weather data 323 according to distance, for instance, by segmenting the data into different area segments occurring at different distances within the area of interest or near the target geographic point. For example, the system 100 can generate a time series dataset for various radius distance search (e.g. 1 km, 2 km, 3 km, 4 km, 5 km, 6 km, etc.) within the area of interest as shown by radii 325. In yet another embodiment, the time series dataset can created for areas of various cells a grid 327 that segments the area of interest. The radii 325 and the grid 327 are provided by way of illustration and not as limitations, and it is contemplated that any equivalent means for segmenting the weather data 323 by distance or areas can be used in the embodiments described herein.

Then the system 100 computes the variability of the weather attribute (e.g., temperature) between each different distance segment (e.g., radii 325 or cells of the grid 327). By way of example, the volatility or variability can be computed as an average difference, standard deviation, coefficient of variation, and/or any other measure of variability between the radii 325, cells of the grid 327, etc.

In one embodiment, the system 100 can use the distance-based or spatial volatility index 321 to determine the interpolation cut-off distance. For example, when the system 100 receives an observation of weather (e.g., temperature) in an area where the distance based volatility index is high then it means that the observation cannot be used to interpolate temperature at farther locations and is only useful for a few meters. However, if the distance based volatility index is low, then it means that there is not much fluctuation of weather expected and thus the system 100 can interpolate the observation to far locations (e.g. several kilometers).

Figure 4:
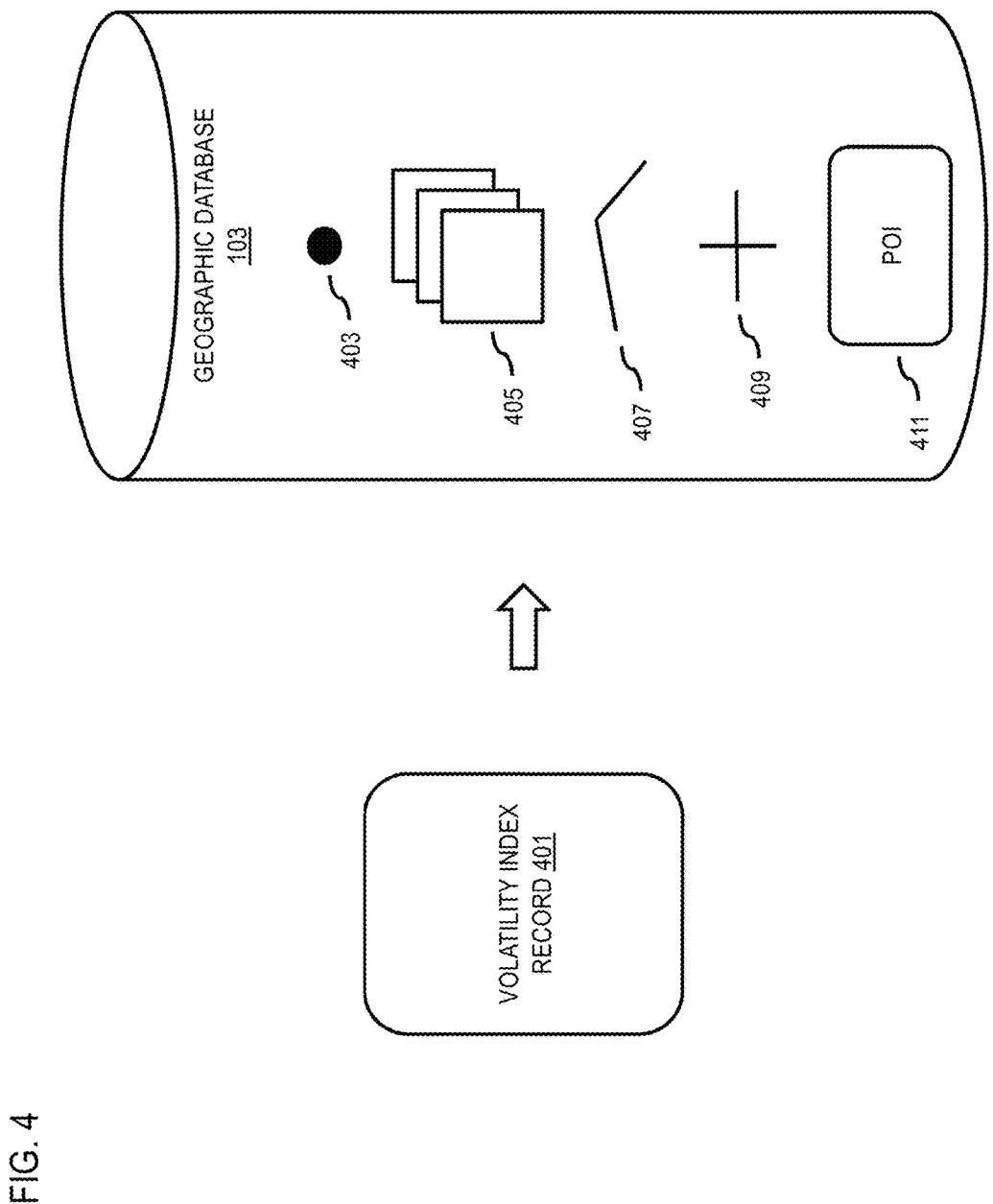
FIG. 4 is a diagram illustrating a process for storing of volatility index record in a geographic database, according to one embodiment.

In one embodiment, as shown in FIG. 4, the system 100 can create a volatility index record 401 to store the generated volatility index (e.g., the temporal volatility index 305 and/or spatial volatility index 321) in, for instance, the geographic database 103. The volatility index record 401 can then be associated with other records in the geographic database 103. For example, the volatility index record 401 can be applied to geographic points 403 (e.g., nodes or other location points), map tiles 405, road links or segments 407, intersections 409, points of interests (POIs) 411, and/or any other map feature represented in the geographic database 103. The volatility index record 401 can then be queried or retrieved from the geographic database 103 using a location-based query specifying one or more of the map features as a query term. Additional description of the geographic database is provided below with respect to FIG. 5.

In one embodiment, by using historical weather data (e.g., 40 years of data from 1970 until 2010), the system 100 can pre-compute or generate volatility indices (e.g., temporal and/or spatial indices) for a range of weather attributes (e.g., temperature, visibility, precipitation, etc.) for selected or all available locations in the world. The historical data, for instance, can be organized in one hour epochs. The resulting volatility indices can then be stored in the geographic database 103.

Returning to FIG. 1, as shown, the system 100 comprises one or more weather stations 101 with connectivity over a communication network 105 to a weather platform 107. In one embodiment, the weather platform 107 performs the functions for providing a weather volatility index according to the various embodiments described herein. As previously discussed, the weather stations 101 can be fixed or mobile weather stations. For example, fixed weather stations 101 can be installed (e.g., permanently or semi-permanently) at locations selected to optimize weather data collection (e.g., a location where representative outside ambient measurements can be taken that minimizes factors that can affect weather data readings such as obstructions, direct exposure to sunlight, clear line of sight, etc.). In contrast, mobile weather stations 101 do not have fixed locations and can move along with a traveler and/or vehicle to which they are associated. As a result, the weather sampling locations for mobile weather stations 101 are highly variable.

In one embodiment, the weather stations 101 (e.g., either fixed or mobile) can be equipped with a range of weather sensors for sensing any number of weather attributes or parameters. For example, these sensors include, but are not limited to: (1) thermometer for measure air or surface temperatures, (2) barometer for measuring atmospheric pressure, (3) hygrometer for measuring humidity, (3) anemometer for measuring wind speed, (4) pyranometer for measuring solar radiation, (5) rain gauge for measuring liquid precipitation, (6) precipitation identification sensor for identifying type of falling precipitation, (7) disdrometer for measuring precipitation drop size distribution, (8) transmissometer for measuring visibility, (8) ceilometer for measuring cloud ceiling, and/or the like. It is contemplated that the weather stations 101 can be equipped with any type of weather or environmental sensor known in the art. In one embodiment, the weather stations 101 collect weather data (e.g., weather attribute values) that can be used to characterize current weather conditions and/or predict future weather conditions (e.g., weather forecasts).

In one embodiment, the weather stations 101 generate weather reports to report a range of weather attributes as a combined weather report (e.g., multiple weather attributes measured at the same time and location) in the following format and/or any other equivalent data format or structure:

BGBW|197301010000|197212312100|197212312100|-
N|2|\*|1|\*|−27|0|999|\*|69|−31|−27|996.6|F|30|-
C|22.0|\*|\*|\*|\*|\*|\*|\*|\*|\*|\*|\*|

In the example above, each field in the weather report or weather data is delineated by a vertical line. In one embodiment, the system 100 (e.g., via the weather platform 107) can generate a volatility index for any of the weather attributes in the weather data, and/or other any weather attribute for which there is weather sensor data. The schema of the weather data in this example (e.g., schema for data fields 1-34 of the weather data) is illustrated below:

(1) City location identifier (up to 9 alphanumeric characters);
(2) Observation time in UTC (String as YYYYMMDDhhmm);
(3) Observation time in LST (Local Standard Time) (String as YYYYMMDDhhmm);
(4) Observation time in local time (String as YYYYMMDDhhmm);
(5) Daylight status (Character—'D' for daytime icons, 'N' for nighttime icons);
(6) Sky descriptor (Integer—corresponding to lookup table);
(7) Precipitation descriptor (Integer—corresponding to lookup table);
(8) Temperature descriptor (Integer—corresponding to lookup table);
(9) Additional air descriptor (optional) (Integer—corresponding to lookup table);
(10) Temperature (Floating Point—Celsius);
(11) Wind speed (Floating Point—km/hr.);
(12) Wind direction (Integer—compass degrees, 0-359, 0==North);
(13) Wind gusts [optional] (Floating Point—km/hr.);
(14) Humidity (Integer—percent)|;
(15) Dew point (Floating Point—Celsius);
(16) Comfort level (Floating Point—Celsius);
(17) Sea level pressure (Floating Point—millibars);
(18) Barometric tendency ('S'—Steady, 'F'—Falling, 'R'—Rising);
(19) Visibility (Floating Point—kilometers);
(20) Sky conditions (C-lear, F-ew, S-cattered, B-roken, O-vercast, X-obscured);
(21) Minimum cloud base (Floating Point—meters);
(22) Maximum cloud base (Floating Point—meters);
(23) Weather type (+FC=tornado/waterspout, FC=funnel cloud, TS=thunderstorm, GR=hail, RA=rain, DZ=drizzle, SN=snow, SG=snow grains, GS=small hail &/or snow pellets, PE=ice pellets, IC=crystals, FG+=heavy fog less than 0.25 miles vis, FG=fog, BR=mist, UP=unknown precip., HZ=haze, FU=smoke, VA= volcanic ash, DU=widespread dust, DS=duststorm, PO=sand/dust whirls, SA=sand, SS=sandstorm, PY=spray, SQ=squall) (DR—low drifting, SH—shower, FZ—freezing, MI—shallow, PR—partial, BC—patches, BL—blowing, VC—vicinity, −LIGHT, +HEAVY, 'NO SIGN'—moderate)|
(24) Hourly precipitation [optional] (Floating Point—centimeters)|
(25) 3-hour precipitation [optional] (Floating Point—centimeters)|
(26) 6-hour precipitation [optional] (Floating Point—centimeters)|
(27) 12-hour precipitation [optional] (Floating Point—centimeters)|
(28) 24-hour precipitation [optional] (Floating Point—centimeters)|
(29) 24-hour maximum temperature [optional] (Floating Point—Celsius)|
(30) 6-hour maximum temperature [optional] (Floating Point—Celsius)|
(31) 24-hour minimum temperature [optional] (Floating Point—Celsius)|
(32) 6-hour minimum temperature [optional] (Floating Point—Celsius)|
(33) Snow cover [optional] (Floating Point—centimeters)|
(34) Solar radiation [optional] (Integer—minutes)|

In one embodiment, the weather stations 101 are equipped with logic, hardware, firmware, software, memory, etc. to collect, store, and/or transmit weather data measurements from their respective weather sensors continuously, periodically, according to a schedule, on demand, etc. In one embodiment, the logic, hardware, firmware, memory, etc. can be configured to perform the all or a portion of the various functions associated generating a weather volatility index according to the various embodiments described herein. The weather stations 101 can also include means for transmitting the collected and stored weather data over, for instance, the communication network 105 to weather platform 107 and/or any other components of the system 100 for generating volatility indices and/or initiating weather-related services or functions based on the volatility indices.

In one embodiment, mobile weather stations 101 can be associated with travelers and/or vehicles (e.g., connected and/or autonomous cars). These travelers and/or vehicles equipped with such mobile weather stations 101 can act as probes traveling over a road network within a geographical area represented in the geographic database 103. Accordingly, the weather volatility indices generated from weather data sensed from locations along the road network can be associated with different areas (e.g., map tiles, geographical boundaries, etc.) and/or other features (e.g., road links, nodes, intersections, POIs) represented in the geographic database 103. Although the vehicles are often described herein as automobiles, it is contemplated that the vehicles can be any type of vehicle, manned or unmanned (e.g., planes, aerial drone vehicles, motor cycles, boats, bicycles, etc.), and the mobile weather stations 101 can be associated with any of the types of vehicles or a person or thing (e.g., a pedestrian) traveling within a road or transportation network. In one embodiment, each weather station 101 is assigned a unique identifier (station ID) for use in reporting or transmitting weather data and/or related probe data (e.g., location data).

In one embodiment, the mobile weather stations 101 can be part of vehicles and/or other devices (e.g., mobile phones, portable navigation devices, etc.) that are part of a probe-based system for measuring weather and traffic conditions in a road network. In one embodiment, each weather station, vehicle, and/or device is configured to report weather data in addition to probe points. By way of example, probe points are individual data records collected at a point in time that records telemetry data for that point in time. As noted, the weather data and/or probe points can be reported from the weather stations, vehicles, and/or devices in real-time, in batches, continuously, or at any other frequency requested by the system 100 over, for instance, the communication network 105 for processing by the weather platform 107.

In one embodiment, the weather platform 107 can use probe data or probe point information to map match locations of weather reports received from mobile weather stations 101 to generate weather volatility indices for the matched locations. By way of example, a probe point can include attributes such as: probe ID, longitude, latitude, speed, and/or time. The list of attributes is provided by way of illustration and not limitation. Accordingly, it is contemplated that any combination of these attributes or other attributes may be recorded as a probe point (e.g., such as those previously discussed above). For example, attributes such as altitude (e.g., for flight capable vehicles or for tracking non-flight vehicles in the altitude domain), tilt, steering angle, wiper activation, etc. can be included and reported for a probe point. In one embodiment, if the probe point data includes altitude information, the transportation network, links, etc. can also be paths through an airspace (e.g., to track aerial drones, planes, other aerial vehicles, etc.), or paths that follow the contours or heights of a road network (e.g., heights of different ramps, bridges, or other overlapping road features).

In one embodiment, the weather platform 107 can be a standalone server or a component of another device with connectivity to the communication network 105. For example, the component can be part of an edge computing network where remote computing devices (not shown) are installed along or within proximity of a given geographical area to provide weather provider/weather station monitoring for weather data collected locally or within a local area served by the remote or edge computing device.

In one embodiment, a weather station 101 can be any device equipped with one or more of the weather sensors discussed above. By way of example, such a device can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the device can support any type of interface to the user (such as "wearable" circuitry, etc.).

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the weather platform 107 may be a platform with multiple interconnected components. The weather platform 107 may include multiple servers, intelligent networking devices, computing devices, components and corresponding software for generating weather volatility indices and performing weather-related services or functions. In addition, it is noted that the weather platform 107 may be a separate entity of the system 100, a part of one or more services 111a-111j (collectively referred to as services 111) of a services platform 113, or included within the weather stations 101.

The services platform 113 may include any type of service 111. By way of example, the services 111 may include weather services, mapping services, navigation services, travel planning services, notification services, social networking services, content (e.g., audio, video, images, etc.) provisioning services, application services, storage services, contextual information determination services, location based services, news services, etc. In one embodiment, the services platform 113 may interact with the weather platform 107, the weather stations 101, and/or one or more content providers 115a-115k (also collectively referred to as content providers 115) to provide the services 111.

In one embodiment, the content providers 115 may provide content or data to the weather platform 107, and/or the services 111. The content provided may be any type of content, such as historical weather data for various weather attributes, mapping content, textual content, audio content, video content, image content, etc. In one embodiment, the content providers 115 may provide content that may aid in generating weather volatility indices and/or initiating weather services and/or functions based on the volatility indices according to the various embodiments described herein. In one embodiment, the content providers 115 may also store content associated with the weather stations 101, the weather platform 107, and/or the services 111. In another embodiment, the content providers 115 may manage access to a central repository of data, and offer a consistent, standard interface to data, such as a repository of historical or current weather data, probe data, probe features/attributes, link features/attributes, etc.

By way of example, the weather stations 101, weather platform 107, services platform 113, and/or the content providers 115 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
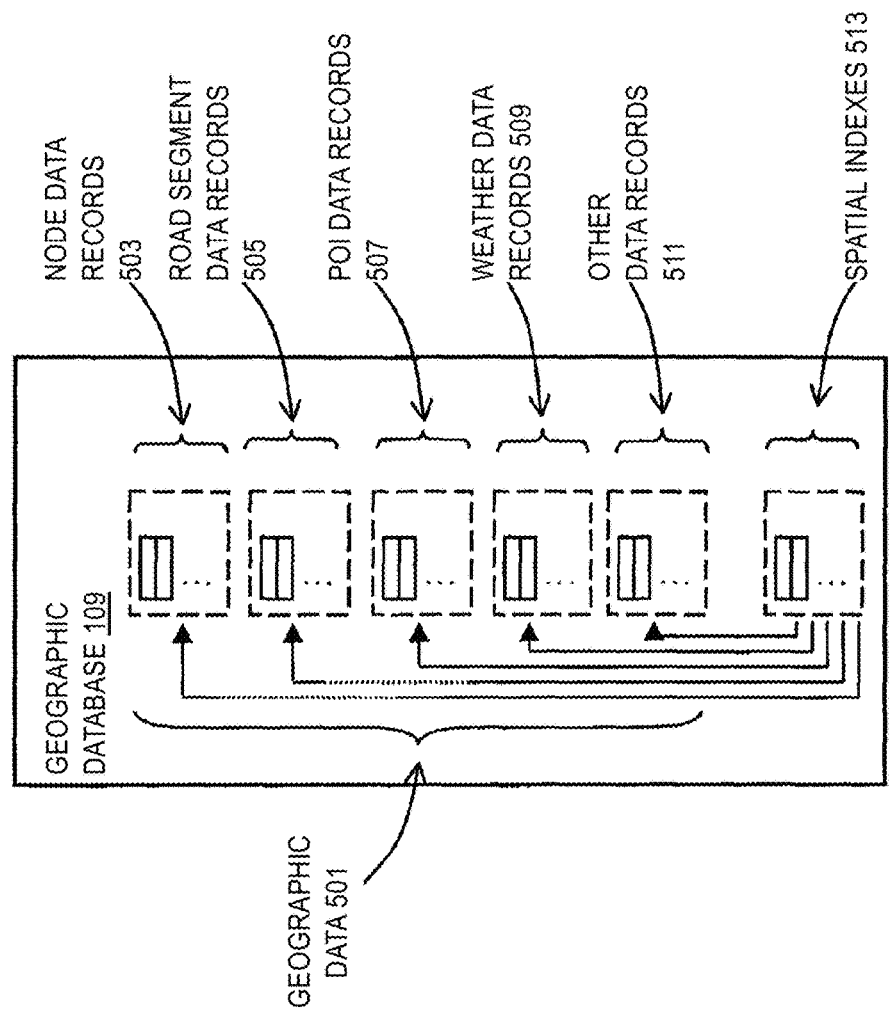
FIG. 5 is a diagram of a geographic database, according to one embodiment.

FIG. 5 is a diagram of the geographic database 103 of system 100, according to exemplary embodiments. In the exemplary embodiments, the volatility indices generated by the weather platform 107 and/or the weather data generated by the weather stations 101 can be stored, associated with, and/or linked to the geographic database 103 or data thereof. In one embodiment, the geographic database 103 includes geographic data 501 used for (or configured to be compiled to be used for) mapping and/or navigation-related services, such as for personalized route determination, according to exemplary embodiments. For example, the geographic database 103 includes node data records 503, road segment or link data records 505, POI data records 507, weather data records 509, and other data records 511, for example. More, fewer or different data records can be provided. In one embodiment, the other data records 511 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using the point-based map matching embodiments describes herein), for example.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions, models, routes, etc. Accordingly, the terms polygons and polygon extrusions/models as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node or vertex. Also, there are no duplicated shape points, nodes, or links. Two links that connect each other have a common node or vertex. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 103 is presented according to a hierarchical or multi-level tile projection. More specifically, in one embodiment, the geographic database 103 may be may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located.

In exemplary embodiments, the road segment data records 505 are links or segments representing roads, streets, or paths, as can be used in the calculated route or recorded route information for determination of one or more personalized routes, according to exemplary embodiments. The node data records 503 are end points or vertices corresponding to the respective links or segments of the road segment data records 505. The road link data records 505 and the node data records 503 represent a road network, such as used by vehicles, cars, and/or other entities. Alternatively, the geographic database 103 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 507. The geographic database 103 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

In one embodiment, the geographic database 103 includes weather data records 509 which store the weather volatility index records 401, weather data reports, and/or related probe point data. For example, the weather data records 409 can store weather volatility index records 401 that can be associated with any of the map features stored in the geographic database 103 (e.g., a specific road or link, node, intersection, area, POI, etc. on which the weather data was collected and used to generate a corresponding weather volatility index record 401.

The geographic database 103 can be maintained by the content provider 115 in association with the services platform 113 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database 103 or data in the master geographic database 103 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 6:
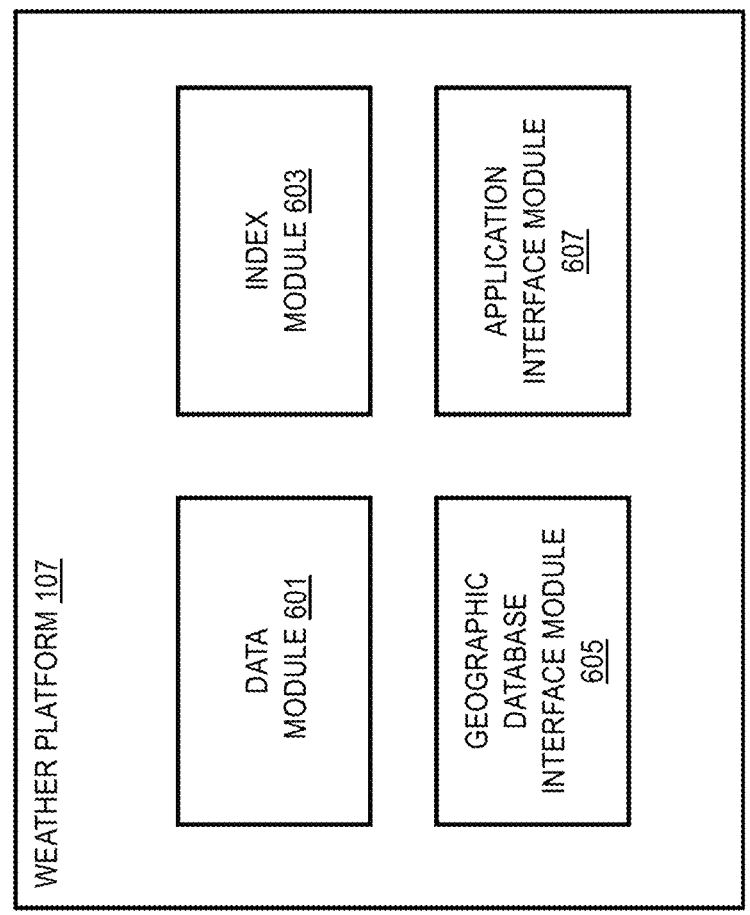
FIG. 6 is a diagram of the components of a weather platform, according to one embodiment.

FIG. 6 is a diagram of the components of a weather platform 107, according to one embodiment. By way of example, the weather platform 107 includes one or more components for providing a weather volatility index according to the various embodiments described herein. It is contemplated that the functions of these components may be combined or performed by other components of equivalent functionality. In this embodiment, the weather platform 107 includes a data module 601, an index module 603, a geographic database interface module 605, and an application interface module 607. The above presented modules and components of the weather platform 107 can be implemented in hardware, firmware, software, or a combination thereof. Though depicted as a separate entity in FIG. 1, it is contemplated that the weather platform 107 may be implemented as a module of any of the components of the system 100 (e.g., a component of the services platform 113, the weather stations 101, etc.). In another embodiment, one or more of the modules 601-607 may be implemented as a cloud based service, local service, native application, or combination thereof. The functions of these modules are discussed with respect to FIGS. 7 and 8 below.

Figure 7:
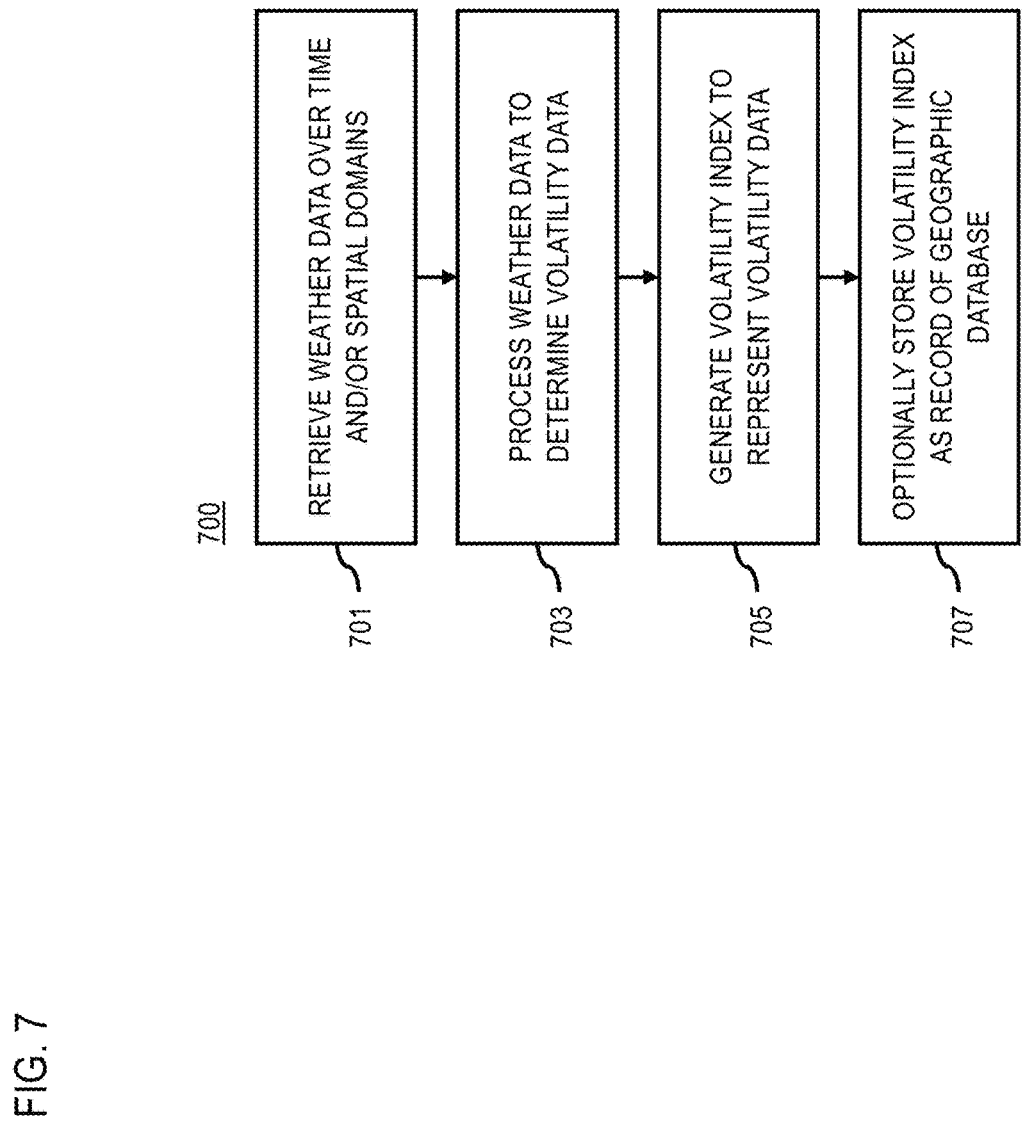
FIG. 7 is a flowchart of a process for providing a weather volatility index, according to one embodiment.
Figure 12:
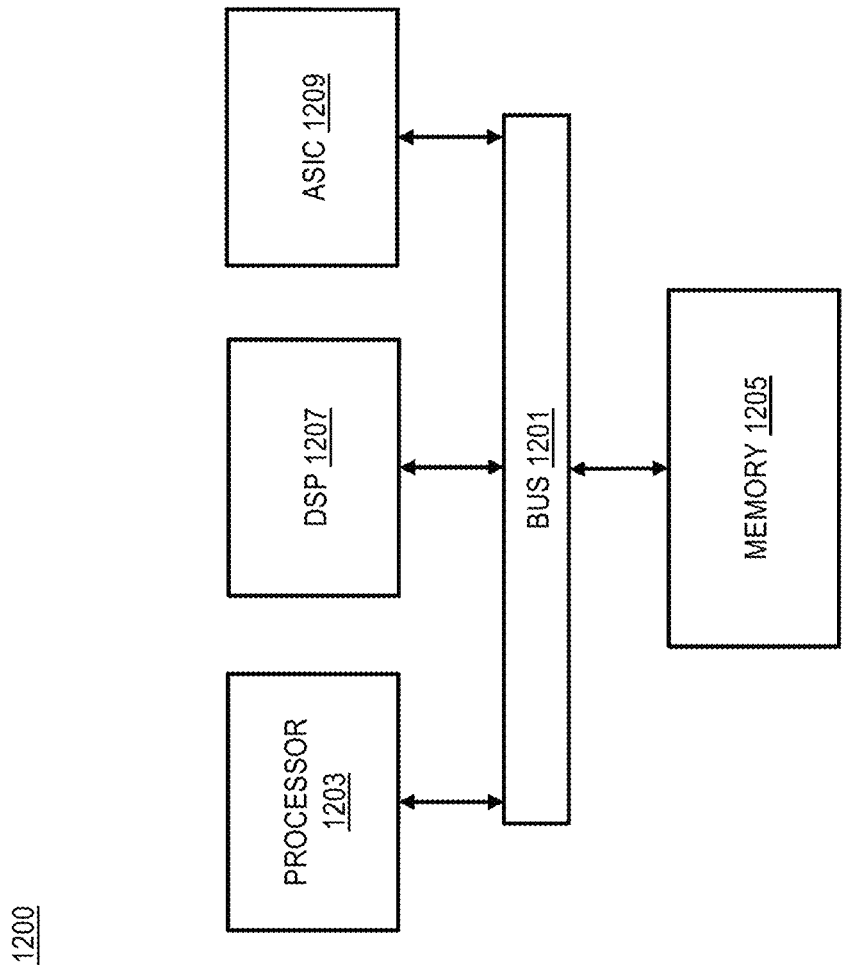
FIG. 12 is a diagram of a chip set that can be used to implement an embodiment.

FIG. 7 is a flowchart of a process for providing a weather volatility index, according to one embodiment. In various embodiments, the weather platform 107 and/or any of the modules 601-607 of the weather platform 107 as shown in FIG. 6 may perform one or more portions of the process 700 and may be implemented in, for instance, a chip set including a processor and a memory as shown in FIG. 12. As such, the weather platform 107 and/or the modules 601-607 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In step 701, the data module 601 retrieves weather data collected from one or more weather sensors over a temporal domain, a spatial domain, or a combination thereof, wherein the one or more weather sensors provide the weather data for at least one geographic point. By way of example, the weather sensors may affixed to one or more weather stations located at the geographic point or whose data can be used to interpolate weather data for the geographic point. In one embodiment, the at least one geographic point can be used to represent a geographic area such as a map tile or any other geographic boundary. Accordingly, the at least one geographic point can be a centroid or reference point(s) within the area. For example, in the case of a map tile of a tile-based representation of a geographic database (e.g., the geographic database 103), the at least one geographic point can be a centroid of the tile, and the geographic area represented by the at least one geographic point is an area represented by the tile.

In step 703, the index module 603 processes the weather data to determine volatility data for at least one weather attribute. As previously described, the volatility data represents how much the at least one weather attribute changes over the temporal domain, the spatial domain, or a combination thereof. In one embodiment, the volatility data includes the weather data collected in step 701 that has been organized by time (e.g., in the case of computing a temporal volatility index) and/or by distance (e.g., in the case of computing a spatial temporal volatility index).

In step 705, the index module 603 generates a volatility index to represent the volatility data. In one embodiment, in the case of a temporal volatility index, the index module 603 computes the volatility index over the temporal domain as an average difference, a coefficient of variation, a standard deviation, and/or any other measure of variability across the different time epochs into which the weather data are organized.

In another embodiment, in the case of a spatial volatility index, the index module 603 computes the volatility index over the spatial domain by segmenting a geographic area represented by the at least one geographic point by distance from the at least one and computing an average difference, a coefficient of variation, a standard deviation, and/or any other measure of variability among the weather data corresponding to each segment of the segmented geographic area. Examples are this segmentation process include specifying different search radii or grid cells to organize data by distance as discussed above.

In one embodiment (e.g., when the volatility index is generated for a plurality of geographic areas or points), the index module 603 normalizes the volatility index for comparison among the plurality of geographic areas. For example, the volatility index can normalized to a value of the at least one weather attribute, and wherein the value includes a maximum value, a mean value, a minimum value, or a combination thereof. In other words, the index module 603 can divide a resulting volatility index for a weather attribute by the maximum value, mean value, minimum, or other reference value to scale the volatility index for comparison among different volatility indices.

In step 707, the geographic database interface module 605 stores the volatility index as a record of a geographic database in association with a representation of the at least one geographic point or a geographic area represented by the at least one geographic point. For example, by creating a volatility index record in the geographic database 103, the geographic database interface module 605 enables the weather platform 107 to link or associated the generated volatility index to any map feature (e.g., node, link, point, road segment, area, POI, etc.), so that a location-based query of the geographic database 103 for that map feature can return the corresponding volatility index. The retrieved volatility index can then be used to support various weather related services and/or functions as described below with respect to FIG. 8.

Figure 8:
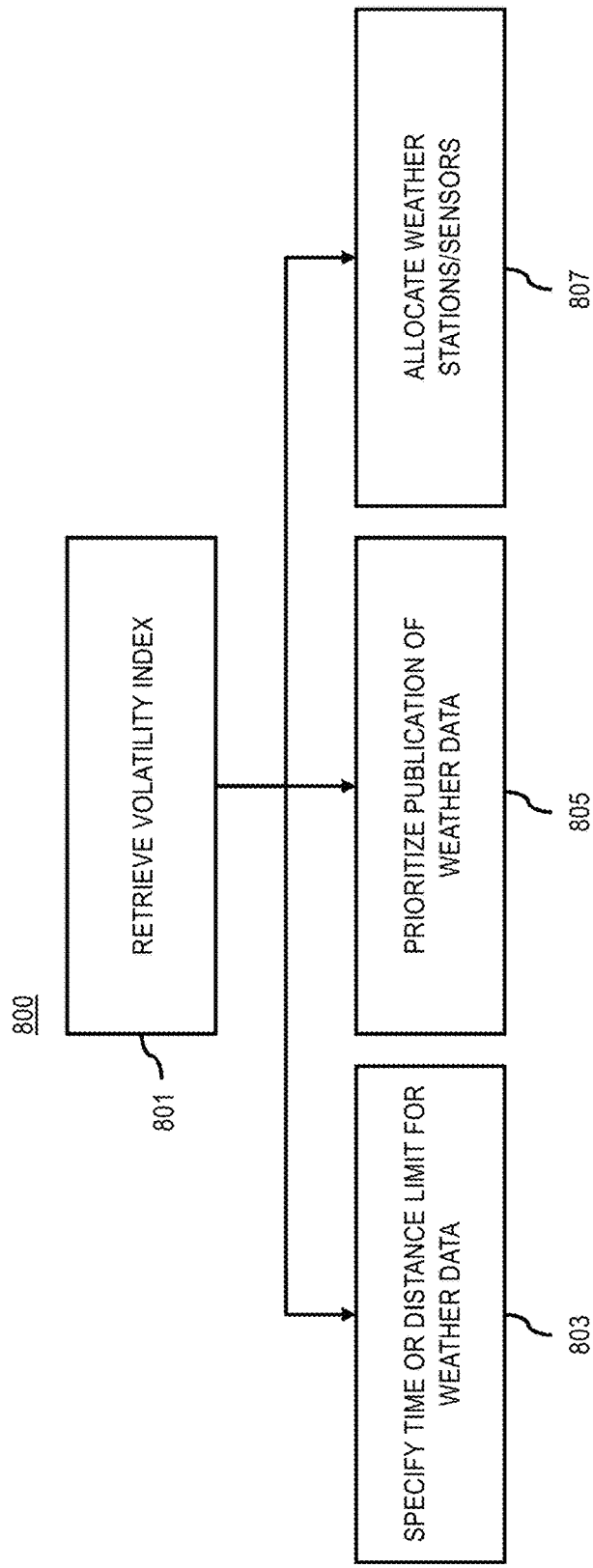
FIG. 8 is a flowchart of a process for applying a weather volatility index to weather related services, according to one embodiment.

FIG. 8 is a flowchart of a process for applying a weather volatility index to weather related services, according to one embodiment. In various embodiments, the weather platform 107 and/or any of the modules 601-607 of the weather platform 107 as shown in FIG. 6 may perform one or more portions of the process 800 and may be implemented in, for instance, a chip set including a processor and a memory as shown in FIG. 12. As such, the weather platform 107 and/or the modules 601-607 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

As described above, the process 800 is performed after the volatility index is generated using, for instance, the process 700 of FIG. 7. In one embodiment, the steps of the process 800 are optional steps, and can be performed in combination or individually.

In step 801, the application interface module 607 begins the process 800 by retrieving the weather volatility index. In one embodiment, the weather volatility index can be retrieved for a target geographic point or area of interest. The geographic point or area can be selected based on weather service needs or requests.

For example, a weather service may be requested to provide interpolated weather data for a given point or area. The application interface module 607 can then retrieve the volatility index corresponding to this point or area. Then, for temporal volatility indices, in step 803, the application interface module 607 specifies a time limit for interpolating subsequent weather data collected from the at least one geographic point or from a geographic area represented by the at least one geographic point based on the volatility index. As previously described, in one embodiment, the application interface module 607 specifies a shorter time limit for interpolating weather data when the volatility index is high (e.g., above a threshold value), and a longer time limit for interpolating weather data when the volatility index is low (e.g., below a threshold value). For example, for a geographic point or area with a high volatility index, a time limit of 30 mins may be specified, so that the weather platform 107 will only use weather reports less than 30 mins old to interpolate weather data to other locations in or near the point or area. Conversely, a time limit of 90 mins may be specified for a point or area with a low volatility index, so that the weather platform 107 can use reports less than 90 mins old to interpolate weather data.

For spatial volatility indices, the application interface module 607 specifies a distance limit for interpolating subsequent weather data collected from the at least one geographic point or from a geographic area represented by the at least one geographic point based on the volatility index. In other words, a weather report received for a particular location would only be used to interpolate weather for another location that is not more than then distance limit away from the location of the weather report. As with the temporal volatility index, the application interface module 607 can retrieve the volatility index for a target geographic point or area. If the point or area has a high volatility index (e.g., above a threshold value), the application interface module 607 can specify a shorter distance limit for interpolation weather data. The application interface module 607 can then set the distance limit to a greater value if the point or areas has a low volatility index.

In step 805, the application interface module 607 the application interface module 607 prioritizes a publication of the weather data for the plurality of geographic areas based on the volatility index. For example, if the weather platform 107 or other weather service is responsible for reporting or publishing weather data for multiple locations. The application interface module 607 can prioritize which of the areas to report weather data for first or how often to publish the data based on the respective volatility indices for each area. In one embodiment, areas with higher volatility indices can be published first or more frequently than for areas with lower volatility indices. This is, for instance, because weather is more likely to change over time and/or distance in areas of higher weather volatility than in areas with lower volatility.

In step 807, the application interface module 607 allocates or recommends an allocation of the one or more weather sensors, one or more weather stations, or a combination thereof among the plurality of geographic areas based on the volatility index. In one embodiment, the system 100 may use weather volatility indices to optimize its allocation of weather equipment (e.g., weather stations 101, weather sensors, etc.) among multiple geographic areas based on the generated weather volatility indices for those areas. For example, areas with higher volatility indices can be allocated with a higher density of weather stations 101 or sensors than areas with lower volatility indices.

Figure 9A:
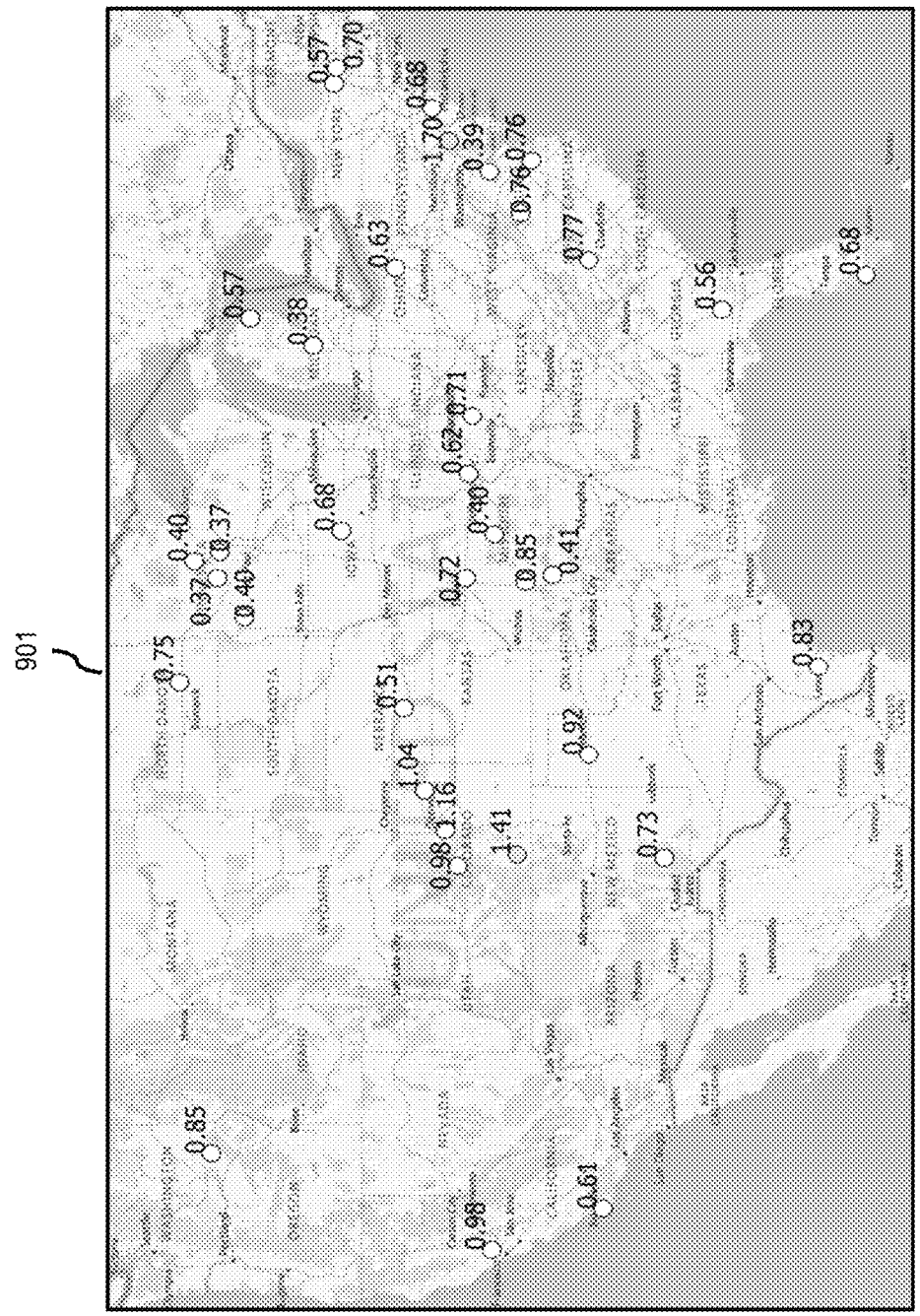
FIGS. 9A and 9B are diagrams illustrating example user interfaces for presenting a weather volatility index in a mapping user interface, according to various embodiments.
Figure 9B:
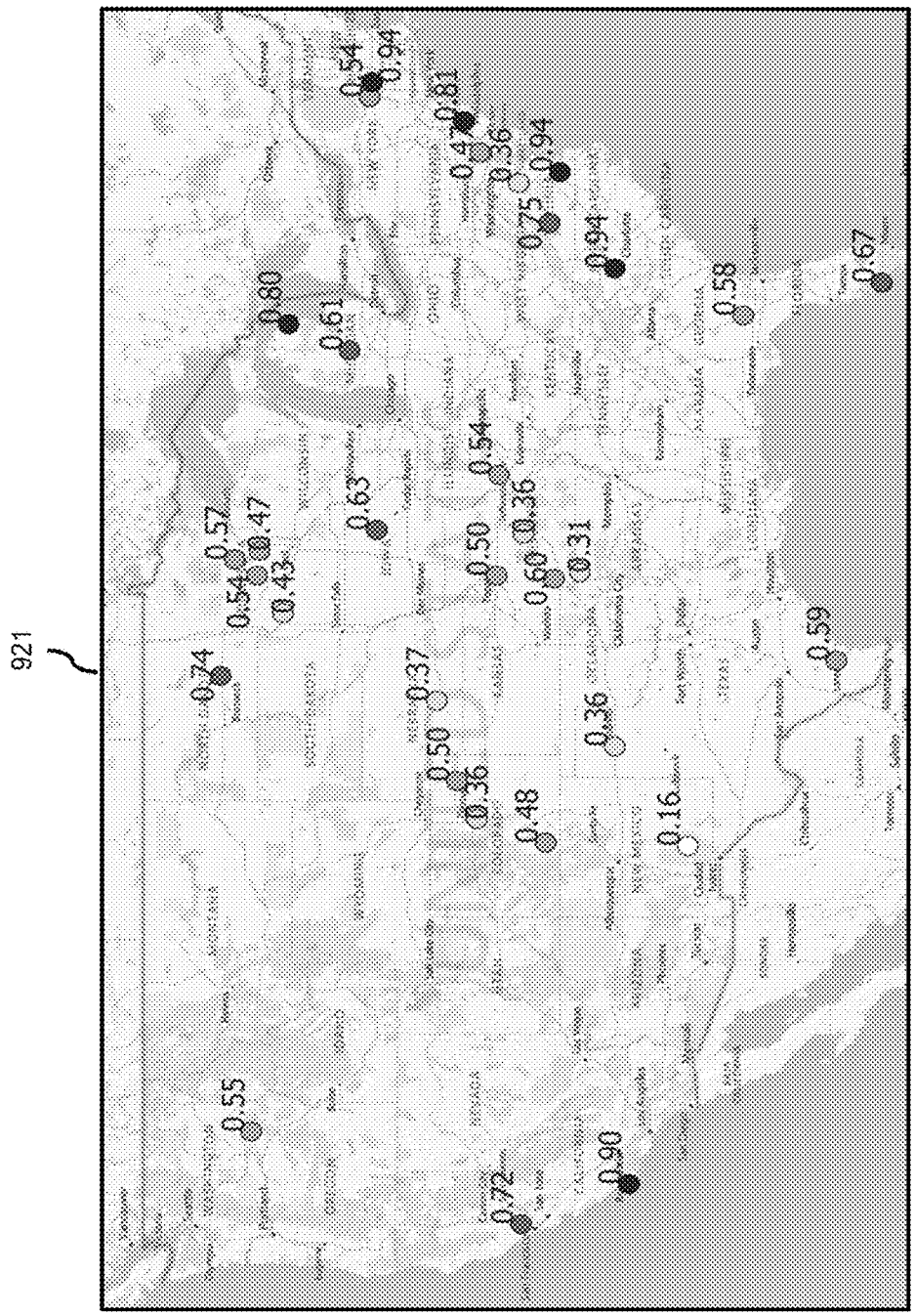

FIGS. 9A and 9B are diagrams illustrating example user interfaces for presenting a weather volatility index in a mapping user interface, according to various embodiments. More specifically, FIG. 9A illustrates an example user interface (UI) 901 presents time based temperature volatility indices for locations that are within the United States. As shown in UI 901, the temporal volatility indices for a temperature attribute are computed and then presented as overlays on at map representation of the United States. The volatility indices shown in FIG. 9A are consistent with is expected based on terrain. For example, mountainous areas (e.g. the Denver Colo.) generally have the highest temperature volatility index followed by the coastal areas. In particular, FIG. 9A shows that the temperature volatility index for the Colorado region is 1 or more. In this example, since the volatility is very high in these regions, it means is that our time cut-off for interpolating temperature observations in Colorado should be the lowest. In other words, when the weather platform 107 receives a temperature reading in Colorado and after a very short amount time (e.g., 30 min to hour) has elapsed, the weather platform 107 will no longer use the report (e.g., for weather interpolation or other use) because the area is highly volatile according to the temperature volatility index.

As another example, FIG. 9A shows that Iowa has a temperature volatility index of 0.68, while in Colorado the volatility index is 1.41. This means, for instance, that the temperature in Iowa is less volatile and varies less over time. Thus, if the weather platform 107 receives an observation of temperature from a weather station or a connected vehicle that is in Iowa then the observation is still useful even after several hours have elapsed (e.g., because of a longer applied time limit). However, if weather platform 107 receives an observation of temperature from a weather station or a connected vehicle that is in Colorado then the observation is NOT useful after several hours have elapsed (e.g., because of a shorter applied time limit).

FIG. 9B illustrates an example UI 921 that presents time based visibility volatility indices computed for locations that are within the United States. The temporal visibility volatility indices are computed according to the various embodiments described herein. The resulting indices shown in FIG. 9B are also consistent with what is expected based on terrain. For example, coastal areas have the highest visibility volatility index. Accordingly, the visibility volatility indices for the Florida region, East coast, West coast, and Great Lakes region are the highest. This is, for instance, because visibility is affected by fog which is heavily influenced by nearby bodies of water Since the visibility volatility is very high in these coastal regions, it means that time cut-off for interpolating visibility observations in these regions should be the lowest. In other words, when the weather platform 107 receives a visibility reading in the areas where the visibility indices are high (e.g., near coastal areas), after a very short time (e.g., 30 min to an hour) has elapsed since the observation, the weather platform 107 will not use that visibility report anymore because the area is highly volatile according to the visibility volatility index.

Figure 10:
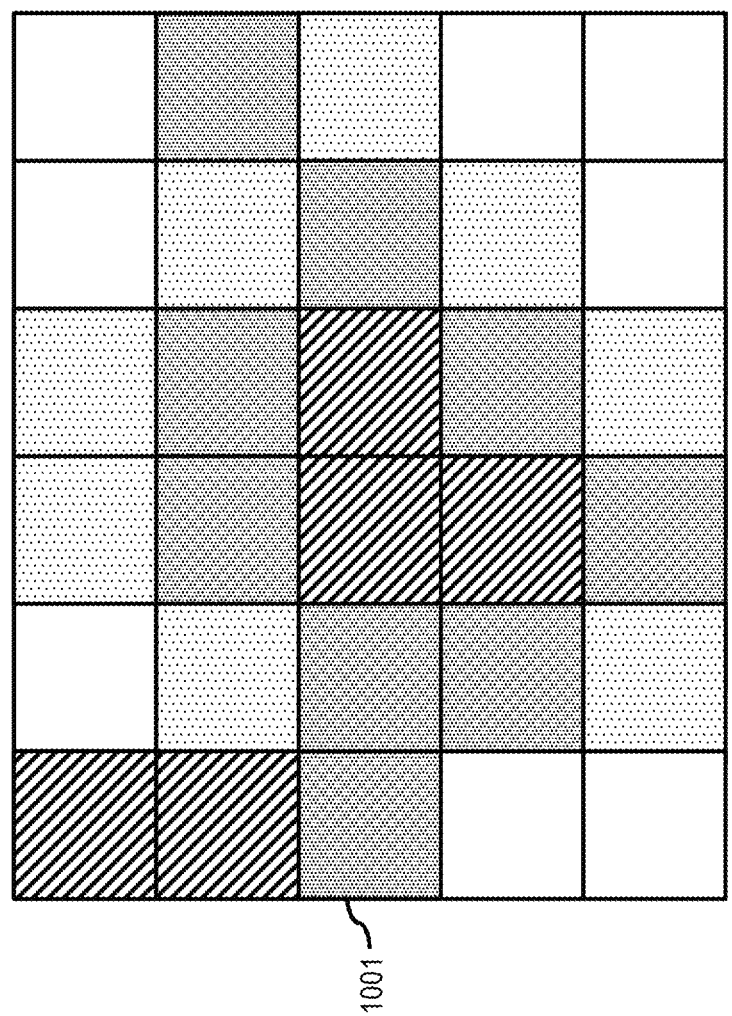
FIG. 10 is a diagram illustrating an example user interface for presenting a volatility index in a tile-based map representation, according to one embodiment.

FIG. 10 is a diagram illustrating an example user interface for presenting a volatility index in a tile-based map representation, according to one embodiment. In the example of FIG. 10, geographic areas are represented using a tile-based representation. Accordingly, the weather platform 107 calculates weather volatility indices for each area represented by the tiles depicted in the map UI 1001. In this example, the index is computed with respect a single weather attribute (e.g., temperature) and depicted in the UI 1001 using shading to represent different volatility ranges. As shown, lighter shades represent ranges of the volatility indices that are the lower, while darker shades represent higher volatility. In this way, instead of viewing the volatility indices numbers, the end user can quickly scan the map to identify areas with high or low volatilities based on the respective shading of the corresponding map tile.

The processes described herein for providing a weather volatility index may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
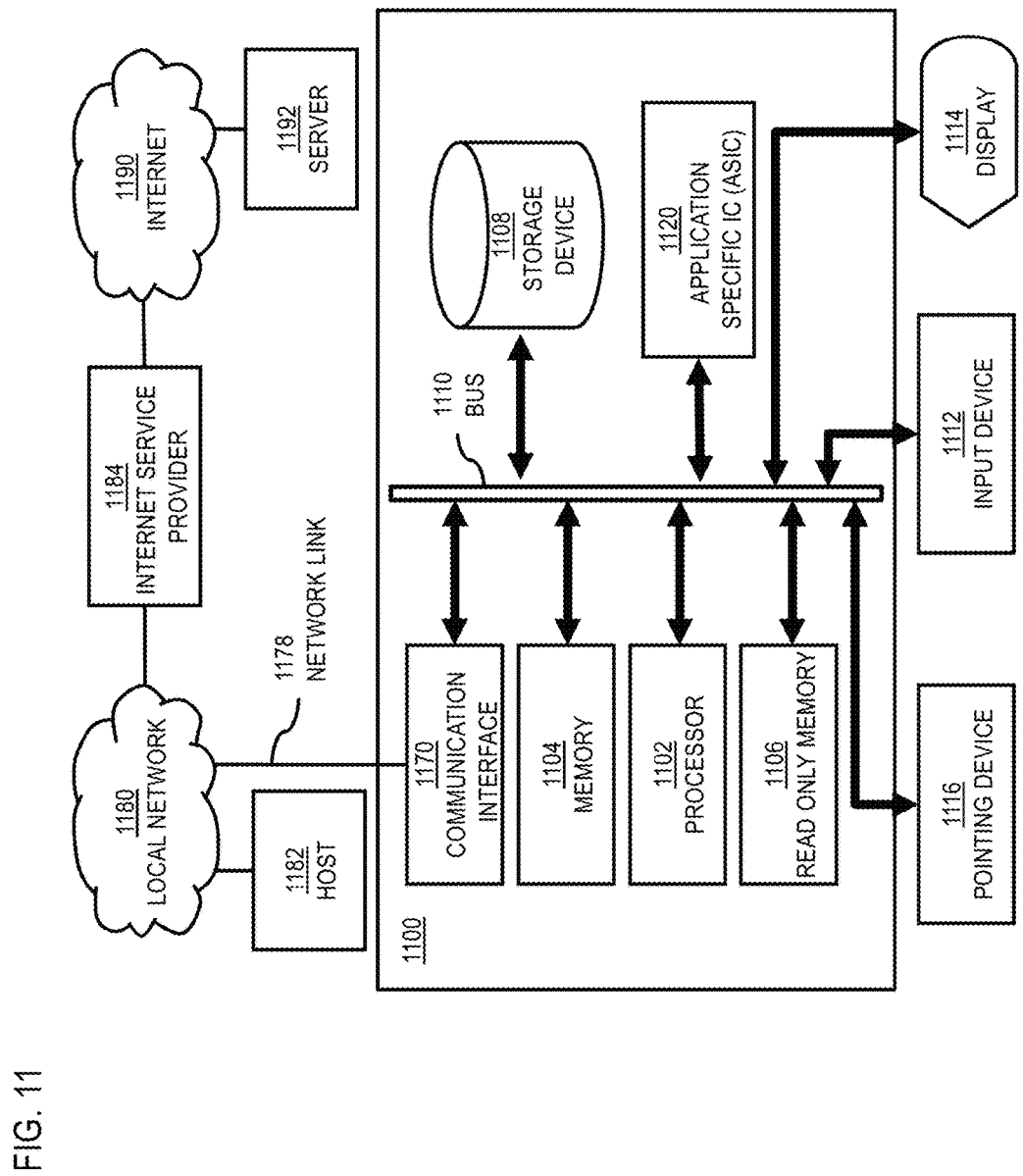
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide a weather volatility index as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing a weather volatility index. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a weather volatility index. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a weather volatility index, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing a weather volatility index.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to provide a weather volatility index as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a weather volatility index. The memory 1205 also stores the data associated with or generated by the execution of the inventive steps.

Figure 13:
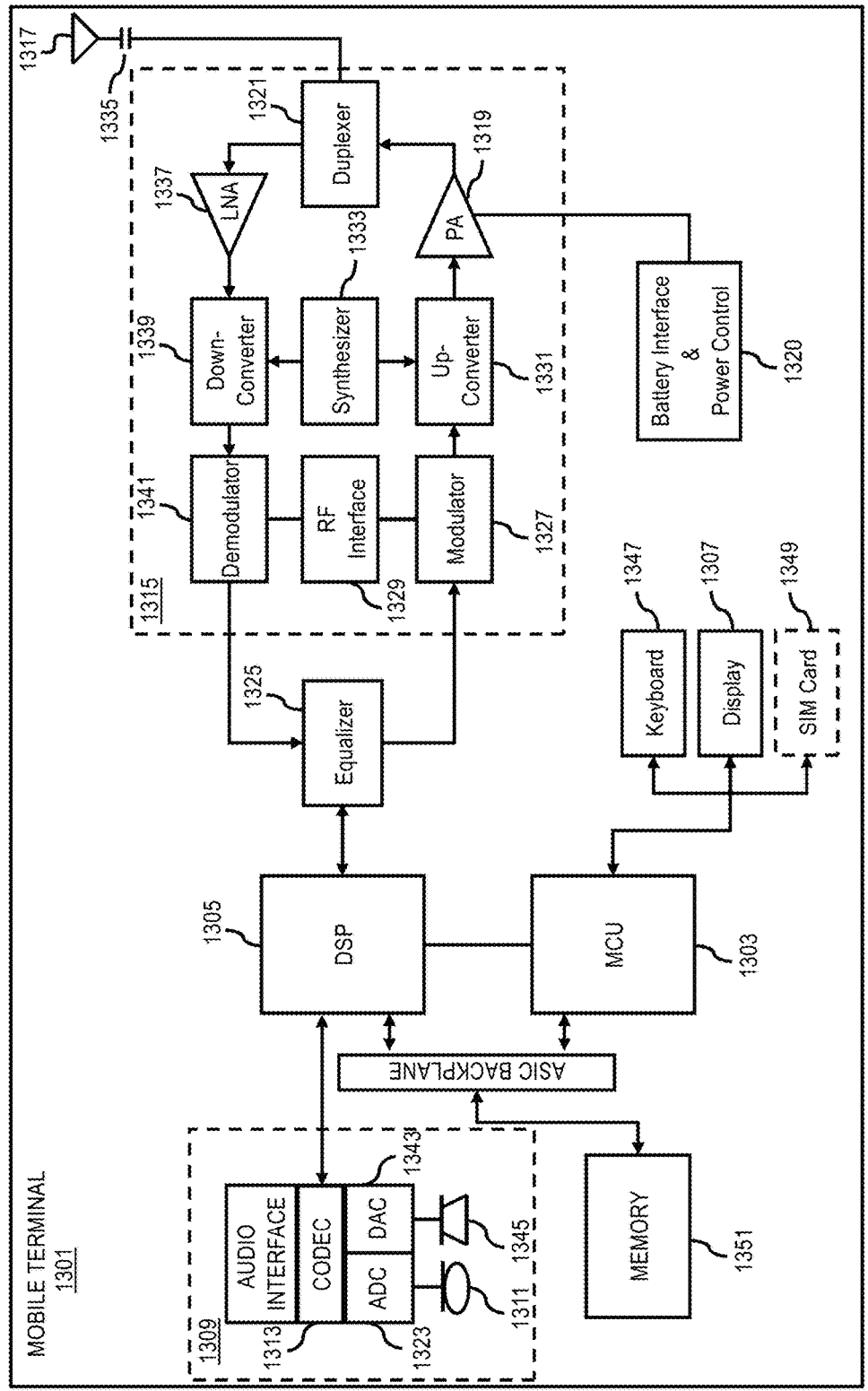
FIG. 13 is a diagram of a mobile terminal (e.g., handset) that can be used to implement an embodiment.

FIG. 13 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide a weather volatility index. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
retrieving weather data collected from one or more weather sensors over a temporal domain, a spatial domain, or a combination thereof, wherein the one or more weather sensors provide the weather data for each of a plurality of geographic points;
calculating based on the weather data to determine how much at least one weather attribute changes per geographic point over the temporal domain, the spatial domain, or a combination thereof as volatility data for the at least one weather attribute;
generating a volatility index to represent the volatility data per geographic point over the temporal domain, the spatial domain, or a combination thereof; and
interpolating subsequent weather data collected from the respective geographic point or from a geographic area represented by the respective geographic point using a time limit, a distance limit, or a combination thereof per geographic point or area based on the respective volatility index, wherein the time limit, the distance limit, or a combination thereof vary for the geographic points or areas based on the respective volatility index.

2. The method of claim 1, further comprising:
storing the respective volatility index as a record of a geographic database in association with a representation of the geographic points or areas.

3. The method of claim 1, wherein a low weather data interpolating limit is applied to a geographic point or area with a high volatility index, and a high weather data interpolating limit is applied to a geographic point or area with a low volatility index.

4. The method of claim 1, wherein the at least one weather attribute includes temperature, pressure, precipitation, visibility, wind speed, wind direction, or a combination thereof.

5. The method of claim 1, wherein the respective volatility index is generated for a plurality of geographic areas, the method further comprising:
prioritizing timewise a publication of the weather data per geographic area for the plurality of geographic areas based on the respective volatility index.

6. The method of claim 1, wherein the respective volatility index is generated for a plurality of geographic areas, the method further comprising:
normalizing the respective volatility index for comparison among the plurality of geographic areas.

7. The method of claim 6, wherein the respective volatility index is normalized to a value of the at least one weather attribute, and wherein the value includes a maximum value, a mean value, a minimum value, or a combination thereof.

8. The method of claim 1, wherein the respective volatility index is generated for a plurality of geographic areas, the method further comprising:
allocating the one or more weather sensors, one or more weather stations, or a combination thereof among the plurality of geographic areas based on the respective volatility index.

9. The method of claim 1, further comprising:
computing the respective volatility index over the temporal domain as an average difference, a coefficient of variation, a standard deviation, or a combination thereof across different time epochs.

10. The method of claim 1, further comprising:
computing the respective volatility index over the spatial domain by segmenting a geographic area represented by the respective geographic point by distance from the at least one and computing an average difference, a coefficient of variation, a standard deviation, or a combination thereof among the weather data corresponding to each segment of the segmented geographic area.

11. The method of claim 1, wherein the respective geographic point is a centroid of a tile of a tile-based representation of a geographic database, and wherein the geographic area represented by the respective geographic point is an area represented by the tile.

12. An apparatus comprising:
at least one processor; and
at least one memory including computer program code for one or more programs,
the at least one memory and the computer program code configured to, with the at least one processor, cause the apparatus to perform at least the following,
retrieve weather data collected from one or more weather sensors over a temporal domain, a spatial domain, or a combination thereof, wherein the one or more weather sensors provide the weather data for each of a plurality of geographic points;
calculate based on the weather data to determine how much at least one weather attribute changes per geographic point over the temporal domain, the spatial domain, or a combination thereof as volatility data for the at least one weather attribute;
generate a volatility index to represent the volatility data per geographic point over the temporal domain, the spatial domain, or a combination thereof; and
interpolate subsequent weather data collected from the respective geographic point or from a geographic area represented by the respective geographic point using a time limit, a distance limit, or a combination thereof per geographic point or area based on the respective volatility index, wherein the time limit, the distance limit, or a combination thereof vary for the geographic points or areas based on the respective volatility index.

13. The apparatus of claim 12, wherein a low weather data interpolating limit is applied to a geographic point or area with a high volatility index, and a high weather data interpolating limit is applied to a geographic point or area with a low volatility index.

14. The apparatus of claim 12, wherein the at least one weather attribute includes temperature, pressure, precipitation, visibility, wind speed, wind direction, or a combination thereof.

15. The apparatus of claim 12, wherein the respective volatility index is generated for a plurality of geographic areas, the method further comprising:
prioritize timewise a publication of the weather data per geographic area for the plurality of geographic areas based on the respective volatility index.

16. The apparatus of claim 12, wherein the apparatus is further caused to:
compute the respective volatility index over the temporal domain as an average difference, a coefficient of variation, a standard deviation, or a combination thereof across different time epochs.

17. The apparatus of claim 12, wherein the apparatus is further caused to:
compute the respective volatility index over the spatial domain by segmenting a geographic area represented by the respective geographic point by distance from the at least one and computing an average difference, a coefficient of variation, a standard deviation, or a combination thereof among the weather data corresponding to each segment of the segmented geographic area.

18. A non-transitory computer-readable storage medium carrying one or more sequences of one or more instructions which, when executed by one or more processors, cause an apparatus to at least perform the following steps:
retrieving weather data collected from one or more weather sensors over a temporal domain, a spatial domain, or a combination thereof, wherein the one or more weather sensors provide the weather data for each of a plurality of geographic points;
calculating based on the weather data to determine how much at least one weather attribute changes per geographic point over the temporal domain, the spatial domain, or a combination thereof as volatility data for the at least one weather attribute;
generating a volatility index to represent the volatility data per geographic point over the temporal domain, the spatial domain, or a combination thereof; and
interpolating subsequent weather data collected from the respective geographic point or from a geographic area represented by the respective geographic point using a time limit, a distance limit, or a combination thereof per geographic point or area based on the respective volatility index, wherein the time limit, the distance limit, or a combination thereof vary for the geographic points or areas based on the respective volatility index.

19. The non-transitory computer-readable storage medium of claim 18, wherein a low weather data interpolating limit is applied to a geographic point or area with a high volatility index, and a high weather data interpolating limit is applied to a geographic point or area with a low volatility index.

20. The non-transitory computer-readable storage medium of claim 18, wherein the at least one weather attribute includes temperature, pressure, precipitation, visibility, wind speed, wind direction, or a combination thereof.

* * * * *